United States Patent [19]

Hawes et al.

[11] Patent Number: 4,474,820
[45] Date of Patent: Oct. 2, 1984

[54] PROCESS FOR THE PREPARATION OF SOLUBLE COFFEE

[75] Inventors: Glen W. Hawes, Bayonne; John G. Tarabocchia, Fairview, both of N.J.; Saul N. Katz, Monsey, N.Y.

[73] Assignee: General Foods Corporation, White Plains, N.Y.

[21] Appl. No.: 405,675

[22] Filed: Aug. 6, 1982

Related U.S. Application Data

[63] Continuation-in-part of Ser. No. 247,663, Mar. 26, 1981, abandoned.

[51] Int. Cl.$^3$ .............................................. A23F 5/50
[52] U.S. Cl. .................................................. 426/387
[58] Field of Search ........................................ 426/387

[56] References Cited

U.S. PATENT DOCUMENTS

| | | | |
|---|---|---|---|
| 2,513,813 | 7/1950 | Milleville | 426/387 |
| 4,107,339 | 8/1978 | Shrimpton | 426/387 |
| 4,281,023 | 7/1981 | Pyves | 426/387 X |

FOREIGN PATENT DOCUMENTS 477670  1/1938  United Kingdom ............... 426/387

Primary Examiner—Joseph Golian
Attorney, Agent, or Firm—Thomas A. Marcoux; Thomas R. Savoie; Daniel J. Donovan

[57] ABSTRACT

This invention is designed to prevent the loss of desirable flavor and aroma volatiles during processing of an aqueous coffee extract obtained from roasted and ground coffee. The overall process of preparing soluble coffee by spray drying a concentrated aqueous extract is improved by employing cold coffee extract in an absorption column to absorb highly volatile coffee flavor and aroma compounds.

4 Claims, No Drawings

PROCESS FOR THE PREPARATION OF SOLUBLE COFFEE

CROSS REFERENCE TO RELATED APPLICATIONS

This application is a continuation-in-part of our now abandoned U.S. Ser. No. 247,663 filed Mar. 26, 1981.

TECHNICAL FIELD

This invention relates to a process for the preparation of soluble coffee by spray drying a concentrated aqueous coffee extract obtained from roasted and ground coffee.

Work done by Huste et al., U.S. Pat. No. 3,345,182, indicates that volatile retention across spray drying is improved with higher solids concentration of aqueous coffee extract. However, since it is economical to operate the percolators at high drawoff factors giving high yields, a low concentration extract is produced. Therefore, a more effective method of concentrating extract is desirable. However, capturing and retaining volatile coffee flavor and aroma compounds is also essential.

The present invention may be used in an improved version of the process disclosed in Shrimpton, U.S. Pat. No. 4,107,339. According to the process as described in the patent, a small percent evaporation is followed by a bulk evaporation to produce a high concentration extract. The condensate from the first evaporation is then added back to the concentrate and subsequently is spray dried.

If one assumes that all flavor compounds are important, then the process as disclosed in the aforementioned U.S. Pat. No. 4,107,339 has two areas that need improvement. The first area is the small percent evaporation. A larger percent evaporation could remove heavier volatiles, however the increased water load would dilute the product. Therefore, a means to separate and concentrate the volatiles before addback such as a distillation column is needed. Secondly, the condenser could be improved by providing a means of capturing the highly volatile compounds that are normally lost.

This invention relates to the use of an absorption column for capturing and retaining volatile coffee flavor and aroma compounds by absorption of the compounds into cold coffee extract. By "cold" is meant coffee extract at a temperature of about 10° to 30° C., preferably less than about 15° C., and having a solids concentration of about 10% to 40%, preferably about 35%. As a processing step, the use of the absorption column permits transfer of desirable coffee flavor and aroma compounds from a venting gaseous stream to a product liquid stream of coffee extract. These flavor and aroma volatiles can then be retained through further processing to the finished product obtained by spray drying the concentrated extract. The gaseous aroma stream can be from any source of volatile aromas, e.g., the vent from a condenser, percolator vent, grinder, etc. Preferably the volatile aromas are the non-condensed flavor and aroma compounds from the condenser. The absorption column is designed for operation at or slightly above atmospheric pressure; but if the gaseous aromas are produced under a vacuum, a sealed gas compressor such as, for example, a diaphragm pump is used to compress the aroma stream, uncontaminated, to atmospheric pressure prior to entering the absorption column.

The invention is based on the finding that highly volatile coffee flavor and aroma compounds have a strong affinity for cold coffee extract and may be readily adsorbed therein. Absorption of coffee aromas using coffee extract is known in the art as described in U.K. Pat. No. 477,670 to Fairweather. However, Fairweather contemplates using a conventional absorption column with plates or bubble-cap arrangements. Such conventional arrangements generate tremendous amounts of foam during operation, which foam generation is inconsistent with the demands of a commercial process.

Unlike prior art absorbers, the absorber of this invention is a packed column absorber which is operated with two continuous phases. Absorbers are most often operated with one continuous phase, typically the liquid phase and one dispersed phase wherein the vapor is passed through the liquid as dispersed bubbles. Such an arrangement, though efficient, is obviously conducive to foam generation when a material susceptible to foaming, such as coffee extract, is used. The absorber of the present invention, by using two continuous phases, permits the retention of desirable flavor and aroma volatiles but avoids the drawbacks of prior art absorbers.

This invention is designed to prevent the loss of desirable flavor and aroma volatiles during processing. In particular, in processes such as, for example, in Shrimpton U.S. Pat. No. 4,107,339, it solves the problem of flavor losses during extract evaporation due to poor condensation of highly volatile flavor and aroma compounds in the aroma condenser. Another process in which the present invention is especially useful is disclosed in U.S. Pat. No. 4,281,023 to Pyves. It can also be used to solve the problem of losses due to poor condensation of volatile steam aromas in processes such as steam stripping of roast and ground coffee, and for collection of grinder gas aromas for jar or brew aroma.

Another advantage of this invention is that it involves the use of relatively low-cost equipment whereas previous equipment for gaseous aroma collectors were high-cost items such as liquid nitrogen condensers or brine-cooled wiped film vapor-liquid contactors such as a Votator. A further advantage of this invention is its multiplicity of uses in processes where it is desirable to capture non-condensable gaseous flavor and aroma compounds for retention through to the finished product.

DISCLOSURE OF INVENTION

A process for the preparation of soluble coffee by spray drying a concentrated aqueous coffee extract obtained from roasted and ground coffee has now been discovered in which the improvements which comprise the following steps result in capturing and retaining volatile coffee flavor and aroma compounds:

(a) evaporating an aqueous coffee extract to a concentration in excess of about 40% by weight solids to produce an aqueous flavor and aroma solution;

(b) steam stripping the aqueous coffee flavor and aroma solution in a distillation column at a pressure of from 100 to 500 mm Hg absolute to strip flavor and aroma compounds and to obtain a concentrated flavor and aroma solution;

(c) condensing the steam strippings in a condenser;

(d) compressing the gaseous non-condensed flavor and aroma compounds from steps (a) and (c);

(e) passing the compressed gaseous non-condensed flavor and aroma compounds to a packed absorption column operating with two continuous phases;

(f) taking a portion of the concentrated stripped extract of step (a) and diluting the same to between 10% and 40% by weight solids;

(g) passing the concentrated extract of step (f) at a temperature between 10° and 30° C. and a viscosity of from 35 to 100 cps. to said absorption column countercurrent so as to absorb the compounds of step (e);

(h) combining the steam strippings of step (c), the remainder of concentrated stripped extract of step (a) and the portion of concentrated extract containing the flavor and aroma compounds of step (g); and (i) spray drying the combined strippings and extracts of step (h).

The evaporative concentration of step (a) may be carried out in a single effect evaporator such as a Centritherm or a multiple effect evaporator.

The solids concentration of the combined strippings and extracts of step (h) fed to the spray dryer is about 35% to 60%, preferably 55% to 60%.

BEST MODE FOR CARRYING OUT THE INVENTION

This invention thus involves the use of a viscous liquid (35 to 100 cps), typically 35% solids concentration, at a temperature of 10° to 30° C., preferably less than about 15° C., as the absorbing medium in a gas absorption column. Generally, absorption columns are not operated with viscous liquids. Previous attempts to absorb gaseous aromas into a viscous liquid, such as concentrated coffee extract were not too successful due to poor operation and foaming, or were deemed economically not feasible. A unique aspect of this invention is the use of both gas and liquid streams as continuous phases in the column, thus preventing foam formation and yet providing enough contact area between gas and liquid so as to effect mass transfer of the volatiles from the gas to the liquid. One absorber typically operated with two continuous phases is a falling film absorber wherein the vapor phase contacts the surface of a falling liquid film, a relatively inefficient arrangement. In the present invention the two continuous phases are uniquely contacted in a packed column, providing greater contact surface area and thus, greater operating efficiency.

The overall process allows coffee extract to be concentrated from 10% to 20% initial upwards to 35% to 60% solids with minimal flavor and aroma loss.

The overall process involves an initial evaporation step, carried out in a single effect evaporator, followed by two recovery systems. The condensate stream from the single effect evaporator is sent to a distillation column where the volatiles are separated and concentrated. The non-condensible streams are recovered in an absorption column by contacting with aroma lean concentrated extract having a viscosity of 35 to 100 cps. and a temperature of about 10° to 30° C.

As hereinbefore noted, the absorption column is operated with two continuous phases wherein the vapor is not dispersed as bubbles through the downward flowing cold coffee extract. Packing is added to the absorption column in order to increase the contact surface area and increase absorption efficiency. The packing must be selected so as to minimize operating difficulties caused by the high viscosity of the coffee extract and its tendency to foam. It has been found that stainless steel saddles work well in the absorption column. Pall rings have also been found acceptable. Other types of packing may be used, depending on the configuration of a given absorption column.

The high viscosity and foaming problems dictate that care must be used in selecting the extract and vapor fluxes as well as the weight ratio of liquid to vapor. The absorption column may be operated with a cold coffee extract flux of from 0.75 gm/cm$^2$/min to 3.0 gm/cm$^2$/min with about 1.8 gm/cm$^2$/min preferred. The vapor flux may range between 2.0 scc/cm$^2$/min and 10.0 scc/cm$^2$/min, preferably less than about 5.0 scc/cm$^2$/min. Fluxes outside the prescribed ranges may be used in the absorption column but typically only at a loss of operating efficiency. The preferred weight ratio of liquid to vapor has been found to be between 100 kg extract/kg vapor and 500 kg extract/kg. vapor. If said ratio is considerably lower, all of the desirable flavor and aroma vapors may not be absorbed. Operation at a ratio greatly in excess of that described increases operating costs without any substantial return.

The step of steam stripping the aqueous flavor and aroma solution resulting from the concentration/condensation of extract may be carried out in a distillation column. Volatiles are removed in the lower section of the distillation column called the stripping or exhausting section. In this section a large amount of the liquid is evaporated, and several stages are provided so that volatiles can be removed. In the upper portion of the distillation column, called the enriching or rectifying section, the volatiles are concentrated by refluxing liquid back into the column and providing a sufficient number of stages to achieve a desired concentration.

Approximately 80% of the extract feed to an evaporator may be evaporated. In this step, most, perhaps as high as 90%, of the volatiles are removed from the concentrate. The extract leaving the evaporator may be at a concentration as high as 65% to 70% solids. Staging of evaporators may be necessary to achieve this concentration. A more efficient evaporator, such as a multiple effect, can be used to perform the bulk of the evaporation.

The distillation column has been designed to recover compounds with a lower limit of relative volatility of 3 to 15. The number of actual trays can be determined using standard design method. An advantage in using distillation, as a separating and concentrating device is its flexibility. By altering design and/or operating parameters, compounds with other relative volatilities can be recovered, thus altering the flavor of the final product.

Non-condensable vapors from both the evaporator and the distillation column were analyzed and found to contain a quantity of volatiles to impact flavor. Recoveries on the absorber were above 95% for carbon compounds.

Spray drying is performed using high concentration extract (between 40% and 55% solids), high spray nozzle pressure (70.3–105.5 kg/cm$^2$, 1000–1500 psi) and low temperature drying conditions (205° C. in, 105° C. out, 400° F. in, 220° F. out).

The spray dried products produced in accordance with this invention have been described as being similar to freeze dried. Flavor comments on the products are: winey, buttery, aromatic, groudsy, smooth and well rounded.

EXAMPLE 1

This invention is adapted to efficiently recover non-condensable gaseous flavor and aroma compounds venting from condensers on an evaporator and distillation column.

1. Feed extract (15% solids) from the percolator scale tank was evaporated under vacuum (125 to 150 mm Hg, absolute) in a single stage evaporator to about 50% concentration.
2. The vapors were condensed in a tower water condenser.
3. The non-condensed gaseous aromas were then compressed to atmospheric pressure and fed to the bottom of the absorption column.
4. The flavor and aroma condensate from step 2 was concentrated in a distillation column 20 fold under vacuum (360 mm Hg, absolute).
5. Non-condensed gaseous aromas from the vacuum distillation column were compressed to atmospheric pressure and fed to the bottom of the absorption column.
6. A portion of the concentrated extract (10% by solids' weight from step 1) was diluted back to 35% solids concentration and fed into the top of the absorber. Operation was continuous, counter-current. The operating conditions are shown in Table 1 below.

TABLE 1

| Absorber column | Extract feed | Non-condensed vapor |
| --- | --- | --- |
| diameter: 5.0 cm | solids conc: 35% | flux: 4.0–9.9 |
| height: 366 cm | temp.: 27° C. | scc/cm$^2$/min |
| packing: 0.6 cm | viscosity: 40 cps | |
| saddles | flux: .75 gm/cm$^2$/min | |

7. The aroma-rich absorber product was then combined with the liquid aroma from the distillation column and the remainder of the concentrated extract. The combined distillate and extracts had a concentration of 40% by weight solids.
8. The combined distillate and extracts were then spray dried.

Gas chromatograph analyses of the gas streams were performed. Taste comparisons of absorber feed and absorber product showed the product to contain significantly higher levels of coffee flavor notes predominantly described as winey, buttery, aromatic, and rich. Gas chromatograms further showed that about 90% by weight of the gaseous aromas were recovered from the gaseous stream fed to the absorber as measured by a flame ionization detector.

EXAMPLE 2

A portion of non-condensed gaseous aromas similar to the aroma feed in Example 1 was fed to an absorption column operating with an essentially aroma and flavor-free cold coffee extract. The operating conditions are shown in Table 2 below.

TABLE 2

| Absorber column | Extract feed | Non-condensed vapor |
| --- | --- | --- |
| diameter: 2 cm | solids conc: 35% | flux: 2.0–3.3 |
| height: 168 cm | temp.: 13° C. | scc/cm$^2$/min |
| packing: 0.6 cm | viscosity: 82 cps | |
| saddles | flux: 1.85 gm/cm$^2$/min | |

Gas chromatograph analyses of the gas streams were performed which showed that about 99% by weight of the gaseous aromas were recovered from the gaseous stream fed to the absorber as measured by a flame ionization detector.

We claim:

1. In a process for the preparation of soluble coffee by spray drying a concentrated aqueous coffee extract obtained from roasted and ground coffee, the improvements which comprise:
   (a) evaporating an aqueous coffee extract to a concentration in excess of about 40% by weight solids to produce an aqueous flavor and aroma solution;
   (b) steam stripping the aqueous coffee flavor and aroma solution in a distillation column at a pressure of from 100 to 500 mm Hg absolute to strip flavor and aroma compounds and to obtain a concentrated flavor and aroma solution;
   (c) condensing the steam strippings in a condenser;
   (d) compressing the gaseous non-condensed flavor and aroma compounds from steps (a) and (c);
   (e) passing the compressed gaseous non-condensed flavor and aroma compounds at a flux of 2.0 to 10.0 scc/cm$^2$/min to a packed absorption column operating with two continuous phases;
   (f) taking a portion of the concentrated stripped extract of step (a) and diluting the same to between 10% and 40% by weight solids;
   (g) passing the concentrated extract of step (f) at a temperature between 10° and 30° C. and a viscosity of from 35 to 100 cps and at a flux of 0.75 to 3.0 gm/cm$^2$/min to said absorption column counter-current and at a weight ratio between 100 and 500 kg extract/kg vapor so as to absorb the compounds of step (e);
   (h) combining the steam strippings of step (c), the remainder of concentrated stripped extract of step (a) and the portion of concentrated extract containing the flavor and aroma compounds of step (g); and
   (i) spray drying the combined strippings and extracts of step (h).

2. A process as in claim 1 in which the evaporative concentration step (a) is carried out in a single-effect evaporator.

3. A process as in claim 1 in which the evaporative concetration step (a) is carried out in a multiple effect evaporator.

4. A process as in claim 1 in which the solids concentration of the combined strippings and extracts of step (h) is 35 to 60%.

* * * * *